United States Patent
Myogi et al.

(10) Patent No.: US 11,591,725 B2
(45) Date of Patent: Feb. 28, 2023

(54) CRANK-TYPE DRIVE DEVICE FOR LOOM

(71) Applicant: TSUDAKOMA KOGYO KABUSHIKI KAISHA, Ishikawa-ken (JP)

(72) Inventors: Keiichi Myogi, Ishikawa-ken (JP); Daigo Yamagishi, Ishikawa-ken (JP); Koichi Tamura, Ishikawa-ken (JP); Kazuya Yama, Ishikawa-ken (JP)

(73) Assignee: TSUDAKOMA KOGYO KABUSHIKI KAISHA, Ishikawa-Ken (JP)

( * ) Notice: Subject to any disclaimer, the term of this patent is extended or adjusted under 35 U.S.C. 154(b) by 0 days.

(21) Appl. No.: 17/509,663

(22) Filed: Oct. 25, 2021

(65) Prior Publication Data
US 2022/0162781 A1   May 26, 2022

(30) Foreign Application Priority Data
Nov. 24, 2020 (JP) .............................. JP2020-194471

(51) Int. Cl.
*D03D 51/02* (2006.01)
*D03D 49/14* (2006.01)
*F16C 3/06* (2006.01)

(52) U.S. Cl.
CPC .................... *D03D 49/14* (2013.01)

(58) Field of Classification Search
CPC ........ D03D 49/14; D03D 49/12; D03D 51/02; F16H 21/20
See application file for complete search history.

(56) References Cited

U.S. PATENT DOCUMENTS 2,845,160 A * 7/1958 Bahan .................... D03D 51/02
                                                          192/113.5
3,732,900 A * 5/1973 Sakamoto .............. D03D 51/34
                                                          139/370.1
(Continued)

FOREIGN PATENT DOCUMENTS

EP          1950332 A1    7/2008
EP          3009549 A2    4/2016
(Continued)

OTHER PUBLICATIONS

Apr. 5, 2022, European Search Report issued for related EP Application No. 21205361.5.

*Primary Examiner* — Robert H Muromoto, Jr.
(74) *Attorney, Agent, or Firm* — Paratus Law Group, PLLC (57) ABSTRACT

A crank-type drive device for a loom including a crank hub non-rotatably attached to a drive shaft, a holder non-rotatably attached to the crank hub, an eccentric shaft supported by the holder, and a connecting member rotatably supported by the holder via the eccentric shaft and a bearing and connected to a drive target member of a loom. The crank hub includes a plate-shaped attaching part which an attached surface of the holder is attached thereto and has an attaching surface in contact with the attached surface, and a fixing mechanism for fixing the crank hub to the drive shaft, the drive shaft being inserted and fitted in the fixing mechanism. The crank hub is configured so that the fixing mechanism is positioned on the attaching surface-side of the attaching part in a plate thickness direction.

2 Claims, 5 Drawing Sheets

(56) References Cited

U.S. PATENT DOCUMENTS

| | | | | |
|---|---|---|---|---|
| 5,209,270 A * | 5/1993 | Vinciguerra | ............ | F16D 11/16 |
| | | | | 139/76 |
| 5,228,480 A * | 7/1993 | Tamura | .................... | D03C 1/16 |
| | | | | 139/55.1 |
| 5,743,305 A * | 4/1998 | Tamura | ................ | D03C 13/025 |
| | | | | 139/55.1 |
| 2021/0381138 A1 * | 12/2021 | Myogi | .................... | D03D 49/62 |
| 2021/0381139 A1 * | 12/2021 | Myogi | .................... | D03D 51/02 |

FOREIGN PATENT DOCUMENTS

| JP | H07-133545 A | 5/1995 |
|---|---|---|
| JP | H10-331054 A | 12/1998 |
| JP | 2008-180289 A | 8/2008 |

* cited by examiner

CRANK-TYPE DRIVE DEVICE FOR LOOM

CROSS-REFERENCE TO RELATED APPLICATION(S)

This application is based on and claims priority under 35 USC 119 from Japanese Patent Application No. 2020-194471 filed on Nov. 24, 2020, the contents of which are incorporated herein by reference.

TECHNICAL FIELD

The present invention relates to a crank-type drive device for a loom including a crank hub non-rotatably attached to a drive shaft, a holder non-rotatably attached to the crank hub, an eccentric shaft supported by the holder, and a connecting member rotatably supported by the holder via the eccentric shaft and a bearing and connected to a drive target member of the loom, wherein, in particular, the holder has an attached surface that is attached to the crank hub, is orthogonal to an axis line of the drive shaft and is a surface facing toward a tip end of the drive shaft, and the crank hub includes a plate-shaped attaching part which the attached surface of the holder is attached thereto and has an attaching surface in contact with the attached surface, and a fixing mechanism for fixing the crank hub to the drive shaft, the drive shaft being inserted and fitted in the fixing mechanism.

BACKGROUND ART

In a loom, a warp delivered from a delivery beam is guided toward a cloth fell with being wound on a tension roll. In order to relieve variation intension caused due to an opening motion of the warp, an easing device configured to positively apply an easing motion to the tension roll every cycle of the loom is used. As a drive means of the easing device, a crank-type drive device is generally used. PTL 1 discloses the crank-type drive device.

In addition, the crank-type drive device that is used for a loom is used not only for the easing device but also for an opening device for a loom disclosed in PTL 2 and for a terry motion mechanism for a pile loom disclosed in PTL 3.

In addition, the crank-type drive device (hereinafter, referred to as 'conventional device') disclosed in PTL 1 includes a crank hub non-rotatably attached to a drive shaft, a holder non-rotatably attached to the crank hub, an eccentric shaft part supported by the holder, and a connecting member rotatably supported by the holder via the eccentric shaft part and a bearing and connected to an easing lever. In the conventional device, the crank hub has a split clamping mechanism as a fixing mechanism, and is attached to the drive shaft by the split clamping mechanism. In addition, the holder is attached in such a form that a surface to be an attached surface is in contact with an end face, which is an attaching surface of the crank hub. Note that, the attaching surface and the attached surface are orthogonal to an axis line of the drive shaft in an attached state.

CITATION LIST

Patent Literature

PTL 1: JP2008-180289A
PTL 2: JPH07-133545A
PTL 3: JPH10-331054A

SUMMARY OF INVENTION

Note that, in the conventional device, the crank hub is formed in such a form that the split clamping mechanism protrudes from an end face on a side opposite to the attaching surface with respect to a plate-shaped flange part including the attaching surface. In addition, the crank hub is attached to the drive shaft in a direction in which the split clamping mechanism is positioned closer to the tip end-side of the drive shaft than the flange part. For this reason, in the conventional device configured in this way, a problem that a motion of the drive target member is made to be different from a desired motion due to bending of the drive shaft may occur.

More specifically, a case where the conventional device is used for the easing device for a loom is described. The drive shaft is rotatably supported on a loom frame via a bearing and is provided to protrude from the loom frame. In a case where the conventional device is configured as described above, the drive shaft should have a length dimension protruding from the loom frame so that at least the flange part of the crank hub and the holder can be arranged between a position in which the split clamping mechanism of the crank hub is fixed and the loom frame in an axis line direction of the drive shaft. As a result, in the conventional device, a dimension (run length) of the drive shaft from a part supported by the bearing to a part to which the crank hub is fixed is large.

Note that, in the above, the conventional device is connected to the tension roll via the connecting member and the like. Therefore, the tension of the warp applied to the tension roll is applied to the conventional device via the connecting member and the like, and the force thereof is applied to the drive shaft via the holder and the crank hub. The force acts in a direction of bending the drive shaft at the part as a fulcrum supported by the bearing. Accordingly, when the run length is large as described above, the drive shaft may be bent. In particular, in a case of a loom configured to weave a wide woven fabric, a high-density woven fabric for industrial materials, and the like, the force applied to the drive shaft is greater, so that the drive shaft may be more bent.

When the drive shaft is bent, a relationship between a rotating phase of the drive shaft and a position of the tension roll during a periodic easing motion deviates, so that the actual motion of the tension roll may differ from an expected motion (desired motion). Note that, the deviation amount corresponds to the bending of the drive shaft, and the weaving is badly influenced depending on a magnitude of the deviation, so that a quality of the woven fabric to be woven may be lowered.

The present invention has been made in view of the crank-type drive device for a loom of the related art, and an object thereof is to provide a configuration of the crank-type drive device making it difficult for the drive shaft to be bent, which causes the above-described problems.

A preamble of the present invention is a crank-type drive device for a loom including a crank hub non-rotatably attached to a drive shaft, a holder non-rotatably attached to the crank hub, an eccentric shaft supported by the holder, and a connecting member rotatably supported by the holder via the eccentric shaft and a bearing and connected to a drive target member of the loom, wherein, in particular, the holder has an attached surface that is attached to the crank hub, is orthogonal to an axis line of the drive shaft and is a surface facing toward a tip end of the drive shaft, and the crank hub includes a plate-shaped attaching part which the attached surface of the holder is attached thereto and has an attaching surface in contact with the attached surface, and a fixing mechanism for fixing the crank hub to the drive shaft, the drive shaft being inserted and fitted in the fixing mechanism.

The present invention is characterized in that the crank hub is configured so that the fixing mechanism is positioned on the attaching surface-side of the attaching part in a plate thickness direction.

In the crank-type drive device for a loom of the present invention, the crank-type drive device may be configured so that a presence range of the fixing mechanism of the crank hub and a presence range of the bearing overlap each other in an axis line direction of the drive shaft.

According to the present invention, in the crank-type drive device for a loom having the preamble as described above, the crank hub to which the holder is attached in a state where the attaching surface of the attaching part is in contact with the attached surface of the holder is configured so that the fixing mechanism is positioned on the attaching surface-side of the attaching part in the plate thickness direction. Thereby, in the crank-type drive device, the position of the fixing mechanism on the crank hub is closer to the side on which the drive shaft is supported by the bearing than the attached surface of the holder with respect to the axis line direction. As a result, a distance in the axis line direction from the part of the drive shaft to which the crank hub is fixed, in other words, from the part of the drive shaft to which the force from the drive target member is applied to the part of the drive shaft supported by the bearing is shortened. Specifically, the run length on the drive shaft is shortened. Thereby, in the crank-type drive device, the bending is less likely to occur on the drive shaft to which the force from the drive target member is applied, as compared to the conventional device configured as described above. Therefore, according to the crank-type drive device of the present invention, the bending of the drive shaft, which causes the above-described problems, is more difficult to occur.

In the crank-type drive device for a loom of the present invention, the crank-type drive device is configured so that the presence range of the fixing mechanism of the crank hub and the presence range of the bearing overlap each other in the axis line direction of the drive shaft. Thereby, the run length on the drive shaft is further shortened. Thereby, in the crank-type drive device, the bending of the drive shaft is more difficult to occur, so that it is possible to prevent occurrence of the problems more securely.

DESCRIPTION OF EXEMPLARY EMBODIMENTS

Hereinafter, an embodiment (the present embodiment) of the crank-type drive device of the present invention will be described with reference to FIGS. 1 to 5. Note that, the present embodiment shows an example where the present invention is applied to an easing device for a loom, as shown.

Figure 1:
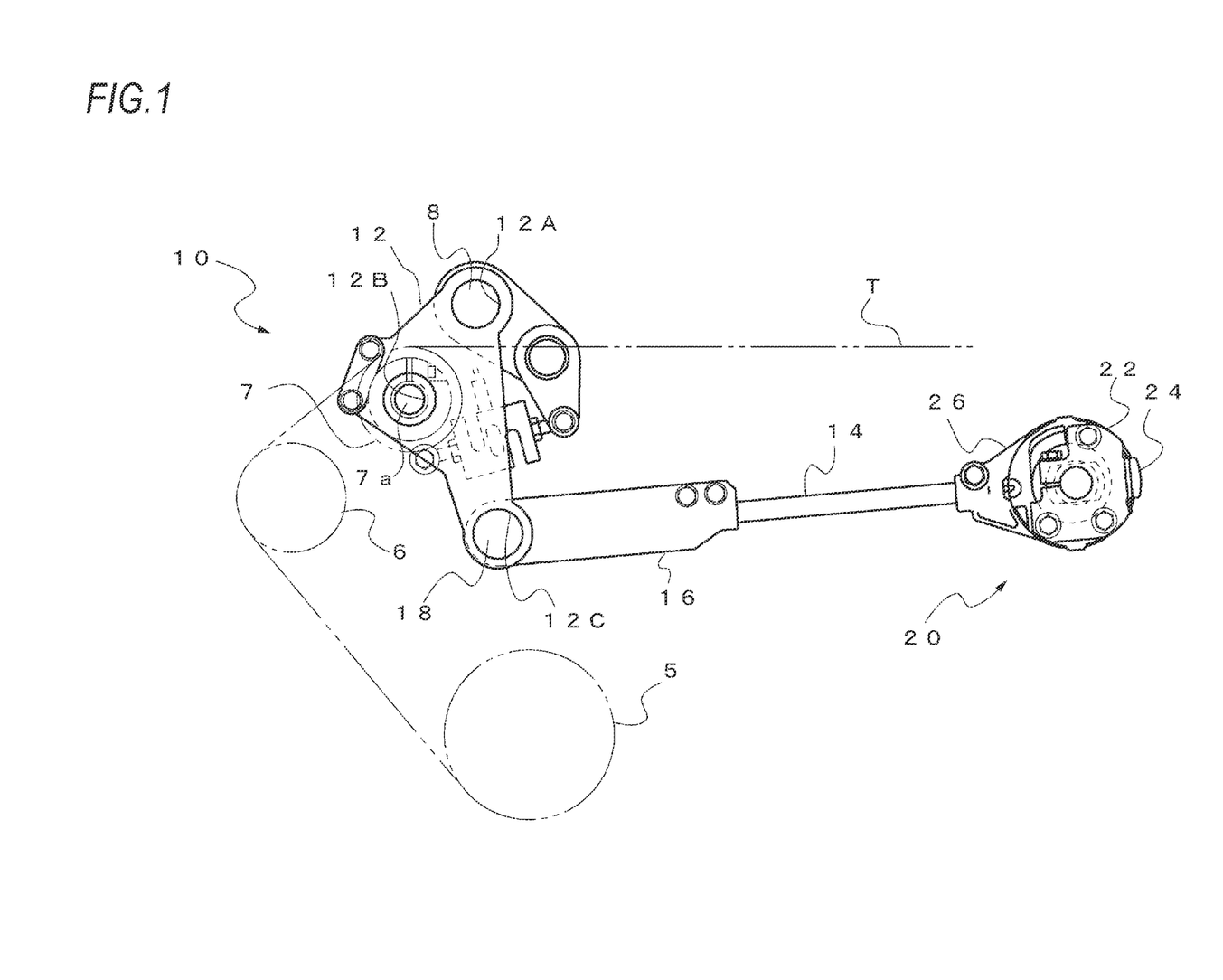
FIG. 1 is a front view showing an easing device to which the present invention is applied.
Figure 2:
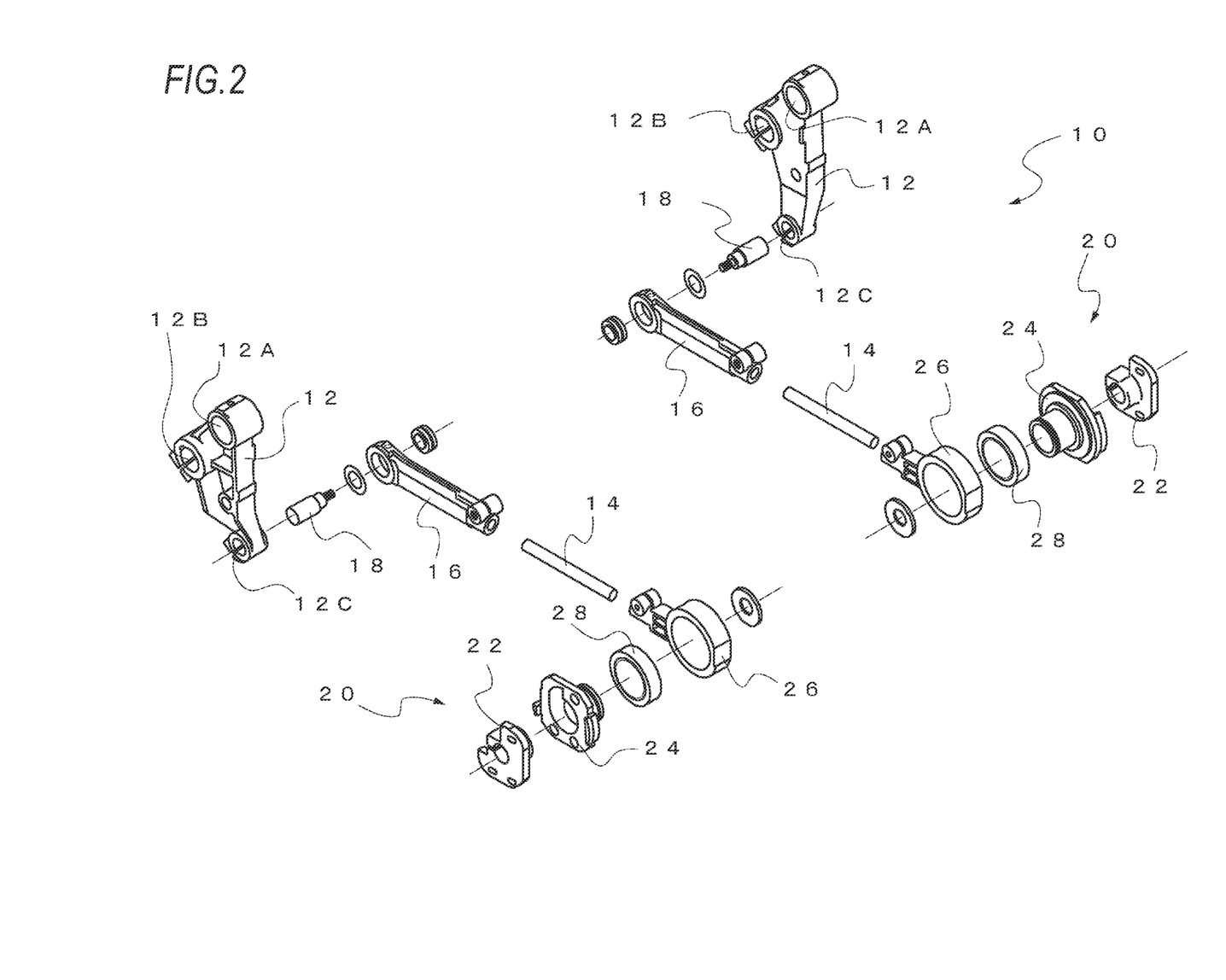
FIG. 2 is an exploded perspective view showing the easing device to which the present invention is applied.

As shown in FIGS. 1 and 2, in a loom, a warp T delivered from a warp beam 5 is guided toward a cloth fell with being wound on a tension roll 7. The easing device 10 includes a pair of easing levers 12 and 12 configured to support the tension roll 7 at both ends, crank-type drive devices (hereinafter, simply referred to as 'drive devices') 20 and 20 each provided in correspondence to each of the easing levers 12 and configured to swing the corresponding easing lever 12, and rods 14 and 14 and arms 16 and 16 for connecting each of the easing levers 12 and each of the corresponding drive devices 20 each other.

Among them, each easing lever 12 is rotatably supported by a loom frame 32 via a support shaft 8 inserted and fitted in a support hole 12A formed at one end portion of the easing lever. The tension roll 7 is supported by both the easing levers 12 and 12 in such a form that shaft parts 7a at both ends are inserted and fitted in support holes 12B formed at intermediate parts of the easing levers 12. Therefore, the tension roll 7 is supported to be swingable about a shaft center of the support shaft 8 with respect to the loom frame 32, via each easing lever 12.

In addition, the other end portion of each easing lever 12 is formed with a support hole 12C, and a shaft member 18 is inserted and fitted in the support hole 12C. Each easing lever 12 is connected to the arm 16 via the shaft member 18. In addition, the arm 16 is connected to the drive device 20 via a rod 14. Specifically, each easing lever 12 is connected to the corresponding drive device 20 via the shaft member 18, the arm 16 and the rod 14.

Figure 3:
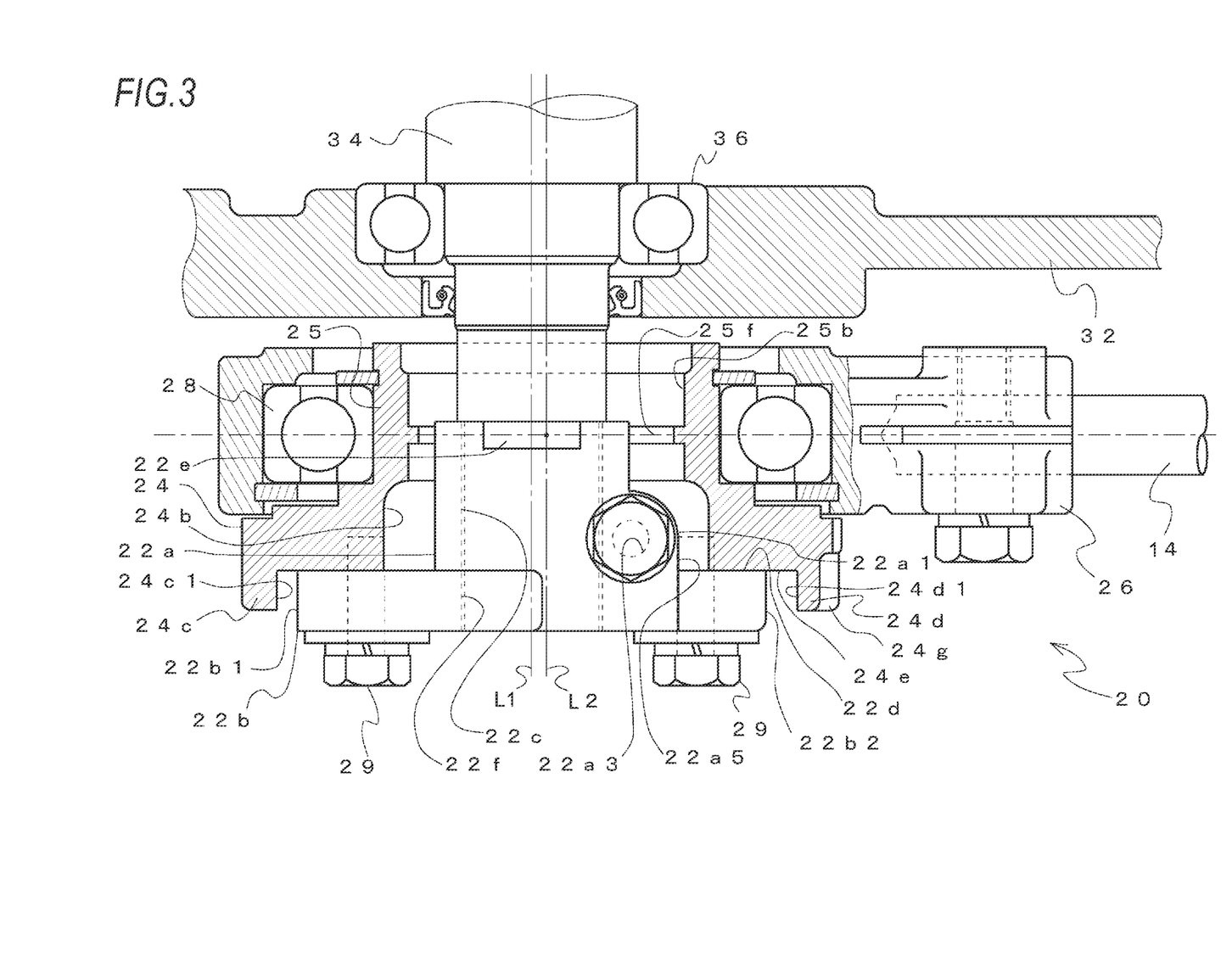
FIG. 3 is a partial sectional view as a plan view showing an embodiment of the present invention.
Figure 4:
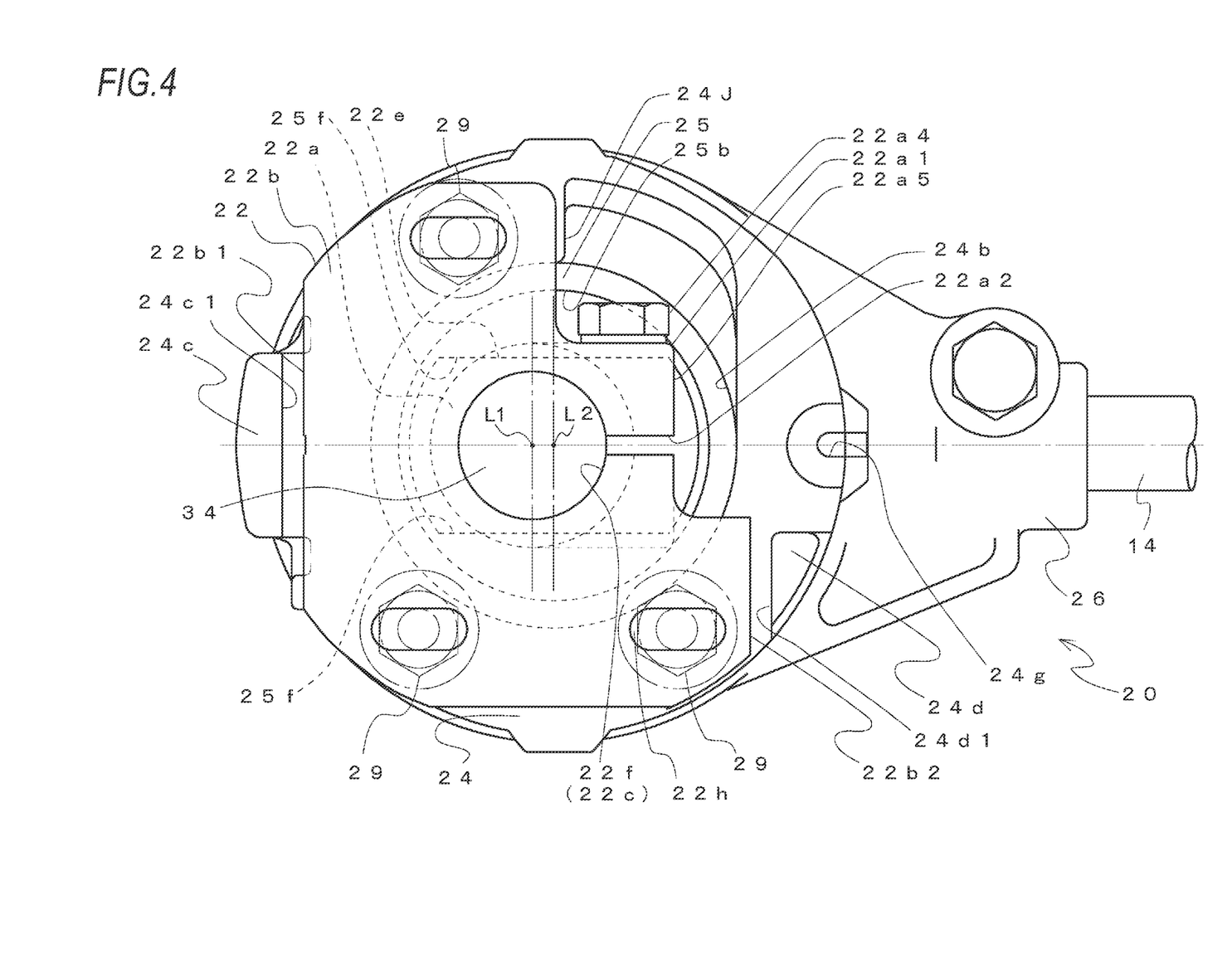
FIG. 4 is a front view showing the embodiment of the present invention.

As shown in FIGS. 3 and 4, each drive device 20 includes a crank hub 22 non-rotatably attached to a drive shaft 34, a holder 24 non-rotatably attached to the crank hub 22, an eccentric shaft part 25 supported by the holder 24, and a connecting member 26 rotatably supported by the holder 24 via the eccentric shaft part 25 and a bearing 28 and connected to the corresponding rod 14.

Note that, the drive shaft 34 is rotatably supported by the loom frame 32 via a bearing, and is provided so that one end thereof protrudes outward from the loom frame 32 in a width direction (weaving direction) of the loom. In addition, the drive shaft 34 is connected to a main shaft (not shown) of the loom via a drive transmission mechanism, and is configured to rotate in synchronization with the main shaft.

The crank hub 22 includes a shaft-shaped shaft part 22a having a through-hole 22c in which the drive shaft 34 is inserted and fitted, and a plate-shaped attaching part 22b for attaching the holder 24. The through-hole 22c of the shaft part 22a is formed so that a center thereof matches a shaft center L1 of the shaft part 22. In addition, the shaft part 22a is provided with a fixing mechanism for fixing the crank hub 22 to the drive shaft 34 inserted and fitted in the through-hole 22c. In the present embodiment, the fixing mechanism is a split clamping mechanism 22a1 having a slot configured to communicate with the through-hole 22c.

In the crank hub 22, the attaching part 22b has a plate shape as described above, and is formed integrally with the shaft part 22a on one end-side in an axis line direction of the shaft part 22a in such a form that a plate thickness direction thereof is matched with the axis line direction of the shaft part 22a. Note that, the attaching part 22b is also formed with a through-hole 22f configured to communicate with the through-hole 22c of the shaft part 22a. The through-hole 22f is formed so that the drive shaft 34 inserted and fitted in the through-hole 22c can be inserted therein. In addition, the attaching part 22b is formed with three insertion holes 22h penetrating in the plate thickness direction and provided so as for fixing bolts 29 for attaching the holder 24 to the crank hub 22 to be inserted therein.

As for the holder 24 and the eccentric shaft part 25, in the present embodiment, both the holder 24 and the eccentric shaft part 25 are integrally formed. Specifically, the holder 24 has a substantial plate shape so as to be attached to the plate-shaped attaching part 22b of the crank hub 22. In addition, the eccentric shaft part 25 is formed integrally with the holder 24 in a form of protruding from one end face of the holder 24 in the plate thickness direction. In this way, in the present embodiment, the holder 24 and the eccentric shaft part 25 are integrally formed, so that the eccentric shaft part 25 (eccentric shaft) is supported by the holder 24.

In addition, the eccentric shaft part 25 is formed with a through-hole 25b for inserting the drive shaft 34 in such a form that a center thereof is matched with a shaft center L2 of the eccentric shaft part 25. The holder 24 is also formed with a through-hole 24b configured to communicate with the through-hole 25b of the eccentric shaft part 25. However, the through-hole 24b is formed as a hole having an inner diameter greater than an inner diameter of the through-hole 25b.

As for the crank hub 22, the holder 24 and the eccentric shaft part 25 configured as described above, the crank hub 22 is non-rotatably attached to the drive shaft 34 in such a form that a portion on a tip end-side of the part of the drive shaft 34 protruding from the loom frame 32 is inserted and fitted in the through-hole 22c. Note that, the attaching of the crank hub 22 to the drive shaft 34 is performed by clamping fixing by the split clamping mechanism 22a1. Therefore, the crank hub 22 can be attached to the drive shaft 34 while freely changing a phase.

In addition, the holder 24 and the eccentric shaft part 25 are provided in a form that the drive shaft 34 is inserted in the through-hole 25b and the through-hole 24b in a direction in which the eccentric shaft part 25 is positioned on the loom frame 32-side with respect to the holder 24, on a side of the loom frame 32 facing toward the crank hub 22. Therefore, the holder 24 faces the crank hub 22 on an end face (the other end face) on an opposite side to a side on which the eccentric shaft part 25 protrudes in the plate thickness direction. In addition, the holder 24 is attached to the crank hub 22 in a state where the other end face is in contact with the attaching part 22b of the crank hub. Therefore, the other end face of the holder 24 becomes an attached surface 24e that is attached to the crank hub 22.

Note that, the attaching of the holder 24 to the crank hub 22 is performed using the fixing bolts 29. More specifically, the holder 24 is formed with female thread holes (not shown) configured to open to the attached surface 24e and provided for screwing the fixing bolts 29 in positions corresponding to the three insertion holes 22h of the crank hub 22. In a state where the holder 24 is in contact with the attaching part 22b of the crank hub 22 on the attached surface 24e, each of the fixing bolts 29 inserted into each of the insertion holes 22h of the crank hub 22 from the tip end-side of the drive shaft 34 is screwed into the corresponding female thread hole of the holder 24, so that the holder 24 is attached to the crank hub 22.

The eccentric shaft part 25 formed integrally with the holder 24 attached to the crank hub 22 in this way is connected to the rod 14 on the tension roll 7-side, which is a drive target member, via the connecting member 26. The connecting member 26 is a member having an annular part, and is fitted to the eccentric shaft part 25 via the bearing 28 at the annular part. Therefore, the connecting member 26 is rotatably supported by the holder 24 via the eccentric shaft part 25. Note that, in a state where the bearing 28 is inserted and fitted in the eccentric shaft part 25, one end face of the bearing 28 in the axis line direction is in contact with the holder 24.

In the drive device 20 that is a crank-type drive device, the drive device 20 should be configured so that the shaft center L2 of the eccentric shaft part 25 to which the rod 14 is connected is eccentric with respect to the shaft center L1 of the drive shaft 34. On the other hand, the drive shaft 34 is inserted in the through-hole 25b of the eccentric shaft part 25 as described above. Therefore, the through-hole 25b of the eccentric shaft part 25 is formed as a hole having an inner diameter by which the desired eccentric state of the eccentric shaft part 25 with respect to the drive shaft 34 is implemented, with respect to the shaft diameter of the drive shaft 34.

In addition, the drive device 20 of the present embodiment is configured so that an attaching position of the holder 24 to the crank hub 22 can be adjusted so as to adjust eccentricity of the shaft center L2 of the eccentric shaft part 25 with respect to the shaft center L1 of the drive shaft 34. More specifically, each insertion hole 22h of the crank hub 22 is formed as an elongated hole that is long in a direction (eccentric direction) connecting the shaft center L1 of the drive shaft 34 and the shaft center L2 of the eccentric shaft part 25 in a state where the crank hub 22 and the holder 24 are attached to each other, as seen in the axis line direction of the drive shaft 34. Therefore, when attaching the holder 24 to the crank hub 22 by using the fixing bolts 29, the attaching position can be adjusted within a range of each insertion hole 22h that is an elongated hole.

In the drive device 20, the crank hub 22 that is attached to the drive shaft 24 on a side closer to the tip end of the drive shaft 34 than the holder 24 is attached to the drive shaft 34 in a direction in which the shaft part 22a having the split clamping mechanism 22a1 is positioned on the loom frame 32-side with respect to the attaching part 22b. Thereby, the holder 24 is attached to the crank hub 22 in a state where the attached surface 24e is in contact with an end face on a side, on which the shaft part 22a protrudes, of the attaching part 22b of the crank hub 22. Therefore, the end face of the attaching part 22b with which the holder 24 is in contact becomes an attaching surface 22d of the crank hub 22.

In this way, in the drive device 20, the crank hub 22 is configured so that the attaching surface 22d, to which the holder 24 is attached, is to be an end face on a side, on which the shaft part 22a protrudes, of the attaching part 22b. In addition, the crank hub 22 is attached to the drive shaft 34 in a state where the attaching surface 22d faces toward the loom frame 32 so that the holder 24 arranged on the loom frame 32-side with respect to the attaching part 22b is attached to the crank hub 22 in a state of being in contact with the attaching surface 22d. The crank hub 22 is attached to the drive shaft 34 and the holder 34 is attached to the crank hub 22 in this way, so that the split clamping mechanism 22a1 as a fixing mechanism is positioned closer to the loom frame 32-side than the attached surface 24e of the holder 24.

Note that, in the present embodiment, the shaft part 22a of the crank hub 22 is formed so that a dimension in the axis line direction (the axis line direction of the drive shaft 34) is greater than a dimension in the plate thickness direction of the holder 24. Thereby, in the state (attached state) where the holder 24 is attached to the crank hub 22, as described above, a position of the end face on the other end-side of the shaft part 22a is within a presence range of the eccentric shaft part 25 positioned closer to the loom frame 32 than the holder 24 with respect to the axis line direction. Specifically, in the above configuration, the presence range of the shaft part 22*a* and the presence range of the eccentric shaft part 25 overlap in the axis line direction. Since the bearing 28 is fitted to the eccentric shaft part 25, as described above, a presence range of the bearing 28 and the presence range of the shaft part 22*a* overlap in the axis line direction. Therefore, the inner diameter of the through-hole 25*b* of the eccentric shaft part 25 is formed greater than the outer diameter of the shaft part 22*a*.

In addition, the split clamping mechanism 22*al* of the shaft part 22*a* includes the slot 22*a*2, as described above, and also includes a protruding portion 22*a*5 protruding from an outer peripheral surface of the shaft part 22*a* in a position continuing to the slot 22*a*2, and a bolt 22*a*4 for split clamping that is screwed to the protruding portion 22*a*5. The slot 22*a*2 is formed over the axis line direction of the shaft part 22*a*. Specifically, the split clamping mechanism 22*al* as the fixing mechanism is present over the presence range of the shaft part 22*a* with respect to the axis line direction. Therefore, in the configuration of the present embodiment, the presence ranges of the split clamping mechanism 22*al* (fixing mechanism) and the bearing 28 overlap each other in the axis line direction of the drive shaft 34.

Note that, in the split clamping mechanism 22*al*, the protruding portion 22*a*5 of the shaft part 22*a* is formed to continue from the one end-side of the shaft part 22*a* and is also formed within a range in which it enters the through-hole 24*b* of the holder 24 in the attached state, with respect to the axis line direction. Therefore, in the attached state, the protruding portion 22*a*5 is positioned in the through-hole 24*b* of the holder 24. In addition, the bolt 22*a*4 for split clamping that is screwed to the protruding portion 22*a*5 is also positioned in the through-hole 24*b* of the holder 24, in the attached state.

Additionally describing, in the present embodiment, the screwing direction of the bolt 22*a*4 for split clamping to the protruding portion 22*a*5 is orthogonal to the axis line direction, like the general split clamping mechanism. Further, in the attached state, the direction of the slot 22*a*2, as seen in the axis line direction, coincides with the eccentric direction. Therefore, the screwing direction of the bolt 22*a*4 for split clamping is orthogonal to the eccentric direction, as seen in the axis line direction.

In addition, as shown in FIG. 4, the attaching part 22*b* of the crank hub 22 is formed so that the bolt 22*a*4 for split clamping is exposed, as seen in the axis line direction, so as to enable an operation on the bolt 22*a*4 for split clamping positioned closer to the loom frame 32 than the attaching part 22*b* from the tip end-side of the drive shaft 34 in the attached state. Specifically, a portion of the attaching part 22*b* has such a shape that is matched with a portion on a side of the protruding portion 22*a*5, on which the bolt 22*a*4 for split clamping is inserted, as seen in the axis line direction.

Also, the through-hole 24*b* of the holder 24 is formed to have an enlarged portion 243 where a portion facing a head portion of the bolt 22*a*4 for split clamping in the attached state and a surrounding thereof are enlarged in a direction (the screwing direction of the bolt 22*a*4 for split clamping) orthogonal to the eccentric direction so as to enable accommodation of the split clamping mechanism 22*al* (the protruding portion 22*a*5, the bolt 22*a*4 for split clamping) provided for the shaft part 22*a* as described above. In addition, the enlarged portion 24J is formed to have such a dimension that the bolt 22*a*4 for split clamping can be operated in the attached state by a tool.

Further, in the present embodiment, in order to guide movement of the holder 24 and the eccentric shaft part 25 in the eccentric direction with respect to the crank hub 22, a pair of guide surfaces 22*e* and 22*e* is formed on the outer peripheral surface of the shaft part 22*a* of the crank hub 22, and a pair of engaging surfaces 25*f* and 25*f* to engage with the pair of guide surfaces 22*e* and 22*e* is formed on the eccentric shaft part 25.

More specifically, the shaft part 22*a* of the crank hub 22 has two parallel planar surfaces 22*e* and 22*e* formed by cutting portions of an outer peripheral surface of an end portion on the other end-side of the shaft part. However, directions of the planar surfaces 22*e* match the direction (=the eccentric direction) of the slot 22*a*2 of the split clamping mechanism 22*al*, as seen in the axis line direction. The planar surfaces 22*e* function as guide surfaces of the shaft part 22*a*.

In addition, the eccentric shaft part 25 is formed so that a part, which faces each guide surface 22*e* of the shaft part 22*a* in the attached state, of an inner peripheral surface of the through-hole 25*b* is to be a planar surface 25*f* parallel to each guide surface 22*e* in the attached state. Further, the through-hole 25*b* is formed so that the parts at which the planar surfaces 25*f* are formed further protrude inwardly than the other part so that an interval between the two planar surfaces 25*f* and 25*f* is substantially the same as an interval between the two guide surfaces 22*e* and 22*e* of the shaft part 22*a*. Thereby, in the attached state, each guide surface 22*e* of the shaft part 22*a* is engaged with the facing planar surface 25*f* of the through-hole 25*b*, and the planar surfaces 25*f* function as the engaging surfaces of the eccentric shaft part 25. In a state where each fixing bolt 29 is unfastened, each engaging surface 25*f* of the eccentric shaft part is engaged and sliding contacted to the corresponding guide surface 22*e* of the shaft part 22*a*, thereby guiding movement of the holder 24 in the eccentric direction.

As described above, in the crank-type drive device 20, the crank hub 22 is configured so that the split clamping mechanism 22*al* is positioned on the attaching surface 22*d*-side of the attaching part 22*b*1 in the plate thickness direction. Therefore, the crank-type drive device 20 is configured so that the split clamping mechanism 22*al* is positioned closer to a side (the loom frame 32-side), on which the drive shaft 34 is supported by the bearing 36, than the attached surface 24*e* of the holder 24*e* with respect to the axis line direction, in the attached state.

As a result, the run length of the drive shaft 34, which is a distance in the axis line direction from the part of the drive shaft 34 to which the crank hub 22 is fixed to the part of the drive shaft 34 supported by the bearing 36, is shorter than the conventional configuration where the split clamping mechanism is positioned closer to the tip end-side of the drive shaft 34 than the attached surface 24*e* of the holder 24 in the attached state. Thereby, in the crank-type drive device 20, the bending is less likely to occur on the drive shaft 34 that receives the force from the tension roll 7, which is a drive target member.

In addition, the crank-type drive device 20 is configured so that the presence range of the split clamping mechanism 22*al* of the crank hub 22 and the presence range of the bearing 28 fitted to the eccentric shaft part 25 overlap in the axis line direction, as described above. Thereby, the crank-type drive device 20 is configured so that the run length of the drive shaft 34 is shorter and the bending is less likely to occur on the drive shaft 34.

In the above, one embodiment of the crank-type drive device for a loom of the present invention has been described. However, the crank-type drive device for a loom of the present invention is not limited to the above embodiment, and can also be implemented in following modified forms.

Figure 5:
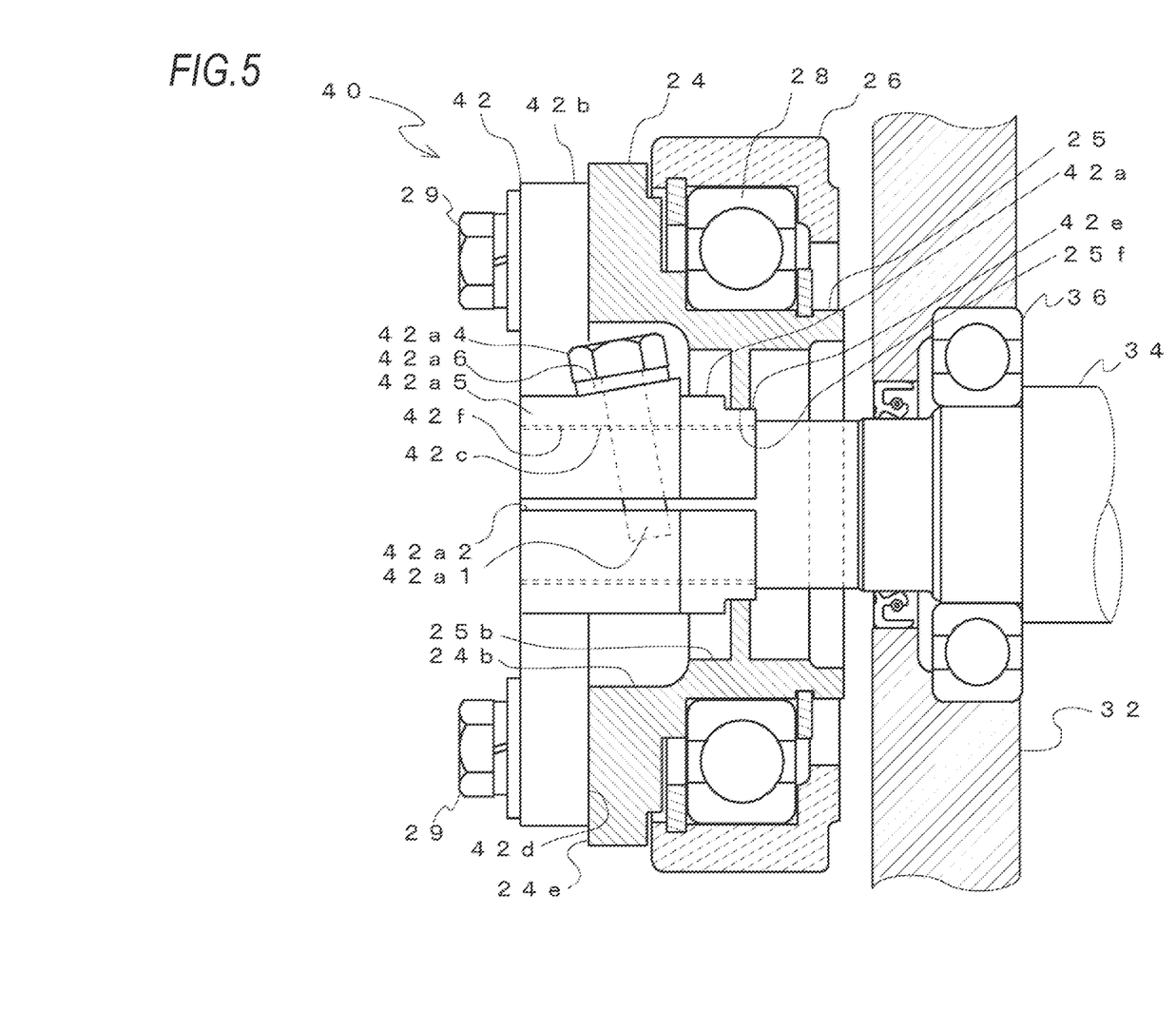
FIG. 5 is a partial sectional view showing another embodiment of the present invention, as seen from an eccentric direction.

(1) As for the split clamping mechanism 22a*l*, in the crank-type drive device 20 of the above embodiment, the split clamping mechanism 22a*l* provided to the shaft part 22a of the crank hub 22 is adopted as a fixing mechanism, and the screwing direction of the bolt 22a4 for split clamping to the protruding portion 22a5 of the shaft part 22a is orthogonal to both the axis line direction and the eccentric direction. However, even when the split clamping mechanism is adopted as a fixing mechanism, the screwing direction is not limited to the above-described direction. For example, as shown in FIG. 5, as seen in the eccentric direction, the screwing direction may be set to a direction inclined relative to the direction orthogonal to the axis line direction, i.e., a direction inclined so that the head portion-side of the bolt 22a4 for split clamping to be screwed is positioned closer to the tip end-side of the drive shaft 34 than the shaft part-side. According to the split clamping mechanism where the screwing direction is set in this way, it is possible to more easily perform the operation on the bolt for split clamping.

(2) In the crank-type drive device 20 of the above embodiment, the split clamping mechanism 22a1 is adopted as the fixing mechanism for fixing the crank hub 22 to the drive shaft 34. However, in the crank-type drive device of the present invention, the fixing mechanism is not limited to the split clamping mechanism as described above. For example, an annular friction-type fastener such as 'POSILOCK' (registered trademark) available from MIKI PULLEY CO., LTD and 'Locking Assemblies' (registered trademark) available from RINGFEDER Company may also be used. In a case where the friction-type fastener is adopted, the friction-type fastener is mounted between the inner peripheral surface of the through-hole of the crank hub and the drive shaft and functions as the fixing mechanism.

In the case where the annular friction-type fastener is adopted as the fixing mechanism, the through-hole of the holder may be formed as a hole having an inner diameter capable of accommodating the fixing mechanism, and may also be formed as a hole without the enlarged portion as described above. Even in the case where the split clamping mechanism is adopted as the fixing mechanism, like the above embodiment, when the through-hole of the holder 24 is formed as a hole having an inner diameter capable of sufficiently accommodating the fixing mechanism, the through-hole may be formed as a hole without the enlarged portion. As such, the holder of the crank-type drive device of the present invention is not limited to the configuration where the through-hole is formed to have the enlarged portion, like the above embodiment.

(3) The crank-type drive device 20 of the above embodiment is configured so that the presence ranges of the split clamping mechanism 22a*l* as the fixing mechanism and the bearing 28 overlap in the axis line direction. However, the crank-type drive device of the present invention is not limited thereto, and may also be configured so that the presence ranges of the fixing mechanism and the bearing 28 do not overlap in the axis line direction. Specifically, for example, a dimension in the axis line direction of the shaft part of the crank hub with the fixing mechanism is made smaller than a dimension of the holder 24 in the plate thickness direction, so that the presence range of the shaft part in the axis line direction becomes the tip end-side of the drive shaft 34 with respect to the eccentric shaft part and the bearing 28 fitted to the eccentric shaft part.

(4) The crank-type drive device 20 of the above embodiment has the configuration where each insertion hole 22*h* of the crank hub 22 is formed as an elongated hole that is long in the eccentric direction, as seen in the axis line direction, and the eccentricity of the shaft center L2 of the eccentric shaft part 25 with respect to the shaft center L1 of the drive shaft 34 can be adjusted by adjusting the attaching of the holder 24 to the crank hub 22 using the fixing bolt 29 within the range of the elongated hole. However, the crank-type drive device of the present invention may also have a configuration where the eccentricity is constant (fixed) (the attaching position of the holder to the crank hub is fixed), specifically, each insertion hole of the crank hub 22 is formed as a circular hole, as seen in the axis line direction.

(5) Further, in the above embodiment, the crank-type drive device 20 for a loom of the present invention is applied to the easing device for a loom. However, a device on a loom to which the crank-type drive device of the present invention is applied is not limited to the easing device, and may also be an opening device as disclosed in PTL 2. In addition, the device to which the present invention is applied may also be a terry motion mechanism for a pile loom as disclosed in PTL 3.

The present invention is not limited to the above embodiment, and can be appropriately changed without departing from the gist of the present invention.

What is claimed is:

1. A crank-type drive device for a loom comprising a crank hub non-rotatably attached to a drive shaft, a holder non-rotatably attached to the crank hub, an eccentric shaft supported by the holder, and a connecting member rotatably supported by the holder via the eccentric shaft and a bearing and connected to a drive target member of a loom, wherein the holder has an attached surface that is attached to the crank hub, is orthogonal to an axis line of the drive shaft and is a surface facing toward a tip end of the drive shaft, and the crank hub comprises a plate-shaped attaching part which the attached surface of the holder is attached thereto and has an attaching surface in contact with the attached surface, and a fixing mechanism for fixing the crank hub to the drive shaft, the drive shaft being inserted and fitted in the fixing mechanism, the crank-type drive device for a loom being characterized in that the crank hub is configured so that the fixing mechanism is positioned on the attaching surface-side of the attaching part in a plate thickness direction.

2. The crank-type drive device according to claim 1, wherein the crank-type drive device is configured so that a presence range of the fixing mechanism of the crank hub and a presence range of the bearing overlap each other in an axis line direction of the drive shaft.

* * * * *